United States Patent
Staton et al.

(10) Patent No.: US 7,510,625 B2
(45) Date of Patent: *Mar. 31, 2009

(54) DEVICE AND METHOD OF USING EXPLOSIVE FORCES IN A CONTAINED ENVIRONMENT

(75) Inventors: Vernon Eric Staton, Lexington, VA (US); Vann E. Staton, Buena Vista, VA (US); Lorenza Glenn Austin, Blue Ridge, VA (US)

(73) Assignee: Dynawave Corporation, Lexington, VA (US)

( * ) Notice: Subject to any disclaimer, the term of this patent is extended or adjusted under 35 U.S.C. 154(b) by 471 days.

This patent is subject to a terminal disclaimer.

(21) Appl. No.: 11/004,229

(22) Filed: Dec. 6, 2004

(65) Prior Publication Data

US 2005/0167059 A1   Aug. 4, 2005

Related U.S. Application Data

(63) Continuation-in-part of application No. 09/664,533, filed on Sep. 18, 2000, now Pat. No. 6,837,971, which is a continuation-in-part of application No. 09/274,810, filed on Mar. 23, 1999, now Pat. No. 6,176,970.

(51) Int. Cl.
  *D21B 1/36* (2006.01)
  *D21C 5/00* (2006.01)
(52) U.S. Cl. ............... 162/21; 162/22; 162/50; 162/247; 72/56; 102/218
(58) Field of Classification Search ............ 162/21–22, 162/50, 13, 247; 72/56; 452/141; 99/451, 99/323.4; 426/238, 625; 264/3.1, 3.4; 102/536, 102/200, 202.3, 218

See application file for complete search history.

(56) References Cited

U.S. PATENT DOCUMENTS

| | | | |
|---|---|---|---|
| 1,663,503 A | 3/1928 | Mason | |
| 1,872,996 A | 8/1932 | Mason | |
| 2,711,369 A | 6/1955 | Birdseye | |
| 2,826,369 A | 3/1958 | Haltmeier | |
| 3,066,822 A | 12/1962 | Orr et al. | |
| 3,228,221 A | 1/1966 | Zernow et al. | |
| 3,248,917 A | 5/1966 | Herring | |
| 3,286,329 A | 11/1966 | Naruse et al. | |
| 3,420,454 A | 1/1969 | Brown, Jr. | |
| 3,461,698 A | 8/1969 | Bennett | |
| 3,492,688 A | 2/1970 | Godfrey | |
| 3,556,414 A | 1/1971 | Eberly, Jr. | |

(Continued)

FOREIGN PATENT DOCUMENTS

GB    1244882 A  *  9/1974

(Continued)

*Primary Examiner*—José A Fortuna
(74) *Attorney, Agent, or Firm*—Stuart I. Smith

(57) ABSTRACT

A method is provided for subjecting a material which is partially in a solid state and partially in a liquid state to explosive forces. The method includes containing the material in a vessel having a length in a first direction and a width in a second direction perpendicular to the first direction, the length being greater than the width; subjecting the material to the explosive forces in the vessel, the explosive forces being caused by introducing energy to the material by discharging a capacitor through a capacitor discharge electrode located within the material; and removing the material from the vessel after being subjected to the explosive forces.

15 Claims, 7 Drawing Sheets

U.S. PATENT DOCUMENTS

| | | |
|---|---|---|
| 3,557,589 A | 1/1971 | Schwarz |
| 3,600,921 A | 8/1971 | Schwartz |
| 3,603,127 A | 9/1971 | Seiffert |
| 3,608,014 A | 9/1971 | Balchan et al. |
| 3,658,268 A | 4/1972 | Martin, III |
| 4,000,032 A | 12/1976 | Bergstrom et al. |
| 4,174,624 A | 11/1979 | Shrum |
| 4,374,538 A | 2/1983 | Rice |
| 4,874,137 A | 10/1989 | Chiba |
| 5,256,430 A | 10/1993 | Suzuki et al. |
| 5,271,726 A | 12/1993 | Bergmann et al. |
| 5,273,766 A | 12/1993 | Long |
| 5,328,403 A | 7/1994 | Long |
| 5,843,535 A | 12/1998 | Dobson |
| 6,146,262 A | 11/2000 | Long et al. |
| 6,168,814 B1 | 1/2001 | Long |
| 6,176,970 B1 * | 1/2001 | Staton et al. ............ 162/21 |
| 6,767,568 B2 * | 7/2004 | Tate et al. ............ 426/263 |
| 6,837,971 B1 * | 1/2005 | Staton et al. ............ 162/21 |
| 2005/0167059 A1 * | 8/2005 | Staton et al. ............ 162/21 |

FOREIGN PATENT DOCUMENTS

| | | | |
|---|---|---|---|
| WO | WO 9952374 A1 | * | 10/1999 |
| WO | WO 0056973 A1 | * | 9/2000 |

* cited by examiner

DEVICE AND METHOD OF USING EXPLOSIVE FORCES IN A CONTAINED ENVIRONMENT

This application is a Continuation-In-Part of prior application Ser. No. 09/664,533, filed Sep. 18, 2000 now U.S. Pat. No 6,837,971, which is a Continuation-In-Part of application Ser. No. 09/274,810, filed Mar. 23, 1999 now U.S. Pat. No. 6,176,970. The entire disclosures of the prior applications are considered as being part of the disclosure of this application and are hereby incorporated by reference herein in their entirety.

BACKGROUND OF THE INVENTION

1. Field of Invention

This invention relates to using explosive forces generated inside a contained environment to subject materials to extremely high pressure. Examples include a process of breaking apart cellulose fibers and the removal of lignin in connection with the wood pulp industry and the hardening of materials, such as metals.

2. Description of Related Art

Currently the wood pulp industry uses chemical steam processing and mechanical grinding and milling to break apart cellulose fibers and remove lignin. These processes use an excess of energy, can take a long period of time, and use environmentally unfriendly chemicals.

Chemically produced pulps are processed in digesters by a sulfite or kraft process. Digesters can be designed for batch or continuous flow.

The sulfite pulping mechanism utilizes the raw materials sulfurous acid and either sodium, magnesium, or calcium bisulfate as the two main ingredients to process the lignin within the wood chips. The sulfurous acid works as a catalyst and breaks the ether linkages in the lignin molecule. Then, the sulfite ions bond to the open sites on the lignin molecules to aid in the lignin dissolution. A high temperature and long cook time are required for these reactions to have successful rates and yields. Normal operating conditions for batch sulfite pulping include a digester temperature of 150° C. with a cook time of four hours.

One problem with the sulfite mechanism is that the sulfurous acid acts on the carbohydrates in the fiber. The more carbohydrates that are lost, the weaker the pulp becomes and the weaker the resulting dried paper product will be. The sulfite cook actually leaves about 4% of the original lignin in the chip to reduce the chance of losing any extra carbohydrates.

The kraft pulping method eliminates the need for sulfurous acid as a raw material. Instead, the raw materials are sodium hydroxide and sodium sulfide. Sodium sulfide can double the rate of delignification over the sulfite process; hence the kraft process is the dominant process in the industry. The mechanics of kraft reactions are similar to those of sulfite reactions. In this case, the OH-ions from the sodium hydroxide will break the lignin ether linkages. Once broken, the hydrosulfide ions (SH—) can bond with the open lignin sites to react with methyl groups and form methyl mercaptans. Methyl mercaptans contribute to the unique odor associated with kraft pulping.

The kraft pulping process leaves more lignin with the digested pulp than the sulfite process. The main reason for this is that the OH-ions can more easily penetrate the crystalline cellulose walls and break down the carbohydrates than can the sulfurous acid ions. Usually about 8% of the original lignin stays with the chips.

During the past decade, the paper industry has seen a significant increase in the percentage of secondary fibers used to make up the paper machine furnish (secondary fibers=OCC—old corrugated containers, MOW—mixed office waste, etc.). In fact, almost all newsprint and an increasing number of tissue and medium board machines are going to 100% recycled fibers for their furnish.

A problem most mills encounter when changing over to recycled fibers from a virgin chemically pulped furnish is a reduction in fiber strength and size. When a mill decides to implement a recycled fiber program, a new recycled fiber plant is usually constructed in order to repulp the recycled products and to remove undesirable contaminants that are introduced to the system from the recycled materials (i.e. latexes, coatings, inks, glues, waxes, oils, etc.). These contaminants can destroy a mills production rate if not efficiently removed in the recycling plant. Hence, a successful recycle fiber plant will take previously made papers and boxes and efficiently deliver to the paper machines the cleanest and strongest pulp possible. The characteristics of each batch of recycled pulp will have a dramatic effect on the efficiency of the paper machines.

Fibers that have already been used to make a box or piece of paper are inherently weaker than virgin fibers. These fibers have already been subjected to refining, high temperature dryer cans, press loading, etc., which take away from their size and strength. The main way to strengthen a recycled fiber is to re-swell and then mechanically refine the fiber. The swelling is done with water and pH control (wood fibers are hydrophilic and will accept water). Once the fibers are swollen they can be refined in order to fibrillate the fibers. Fibrillation is when a single fiber is subjected to mechanical forces that cause fibrils to branch off of the original fiber. This action will increase the surface area of the fiber, which will form a stronger mat on the paper machine wire. Swelling and refining also help open up the hydroxyl sites on the fiber and fibrils, which increases the chance of hydrogen bonding between the fibers. Hydrogen bonding is essential for a strong finished sheet of paper.

U.S. Pat. Nos. 5,273,766 and 5,328,403 disclose a tank for tenderizing meat in which the meat is supported along a hemispherical wall of the tank and then subjected to a shock wave produced by an explosive charge. The tank disclosed in these two patents is specifically hemispherical in shape and therefore the amount of meat processed by the tank per explosive charge is limited to the amount of meat that can be supported along the hemispherical wall of the tank. To increase the amount of meat processed per explosive charge, the radius of the hemisphere that defines the shape of the tank must be increased, greatly increasing the volume of water required to fill the tank. It is well known that for a given surface area a sphere has the greatest volume of any shape.

SUMMARY OF THE INVENTION

The invention provides an elongated tank for containing explosive forces. The elongated tank of the invention provides better results than the tank disclosed in U.S. Pat. Nos. 5,273,766 and 5,328,403 due to its elongated shape. The elongated shape of the tank of the invention more efficiently subjects the material in the tank to the explosive forces than does the spherical shape of the tank in U.S. Pat. Nos. 5,273,766 and 5,328,403. In addition, for a given volume of liquid/water, more material can be processed in the elongated tank of the invention because it is not spherical in shape.

An embodiment of the invention has a vessel having a vessel-top and a vessel-bottom. A liquid containing the material, for example wood chips, to be subjected to the explosive forces is held in the vessel-bottom. The vessel-top is positioned such that the explosive forces are substantially contained within the vessel-bottom and vessel-top. The material is subjected to pressure waves in the water created by the explosive forces. The explosive forces can, for example, be provided by an explosive, such as PETN, or by capacitor discharge through electrodes in the vessel-bottom.

The invention can greatly reduce the amounts of energy, chemicals, and/or time required to process certain materials.

For example, the invention can greatly reduce the amounts of energy, chemicals and time required to process and tear down the cellulose fibers and remove lignin in the wood pulp industry. By introducing a delignification vessel into the current process flow, either before or after the digesters, the process efficiency of chemical pulping can be increased. The delignification vessel of the invention subjects wood chips, for example, to explosive forces transmitted through water or other liquid. The resulting extremely high pressure causes the liquid to penetrate the wood chips to extract the undesired lignin component. The explosive forces can be generated by any means such as, for example, an explosive charge or capacitor discharge.

The vessel can be integrated into a recycled fiber plant to help soften/swell the fibers during repulping and to aid in the release/removal of the undesirable contaminants being introduced with materials such as papers and boxes. By detonating a submerged charge of explosive, a plant could very cost effectively swell the fibers with good water penetration, fibrillate the fibers with very high-pressure forces, and release inks, latex, coatings and other undesirable contaminants by subjecting them to the high pressures of the detonation wave.

Successful integration of the vessel of the invention could relate to huge savings in a mill's operating costs. Stronger pulps may result than are produced by the current refining methods (because of the reduction in cutting by the refiners) or a simple reduction in the amount of refining needed and reduced power consumption may result. Hence the mill could increase its percentage use of recycled fiber, resulting in financial and environmental benefits. Also, with better contaminant release from the fibers, the recycle plant could see much higher efficiency with its screens, centrifugal cleaners, clarifiers, etc., and hopefully reduce the amount of equipment needed. Chemical consumption for contaminant control would also be greatly reduced with more efficient removal in the plant.

Another example of an application of the invention is in the hardening of metals, such as, for example, hardening the exterior layer of metal golf club heads, axes, chisels and other tools. Such a hardening process could allow the use of cheaper metals, as compared to the currently popular titanium, while still providing a hard surface for superior performance. In this application, the metal to be hardened can be held in place within the vessel-bottom by, for example, support wires or stands, or simply laid on a bed of sand placed in the vessel-bottom. The metal is hardened by being subjected to the pressure waves created in the liquid by the explosive forces.

BRIEF DESCRIPTION OF THE DRAWINGS

The invention will be described in relation to the following drawings in which like reference numerals refer to like elements, and wherein.

DETAILED DESCRIPTION OF PREFERRED EMBODIMENTS

The invention provides a cost effective process for altering the properties of materials through subjecting the materials to extremely high pressures.

The invention increases the process efficiency of chemical pulping by introducing a vessel into the current process flow before the digesters. The invention can be applied to both batch and continuous flow digesters.

The invention will be discussed using an explosive charge, but other means of generating explosive forces within the liquid can be used.

Figure 1:
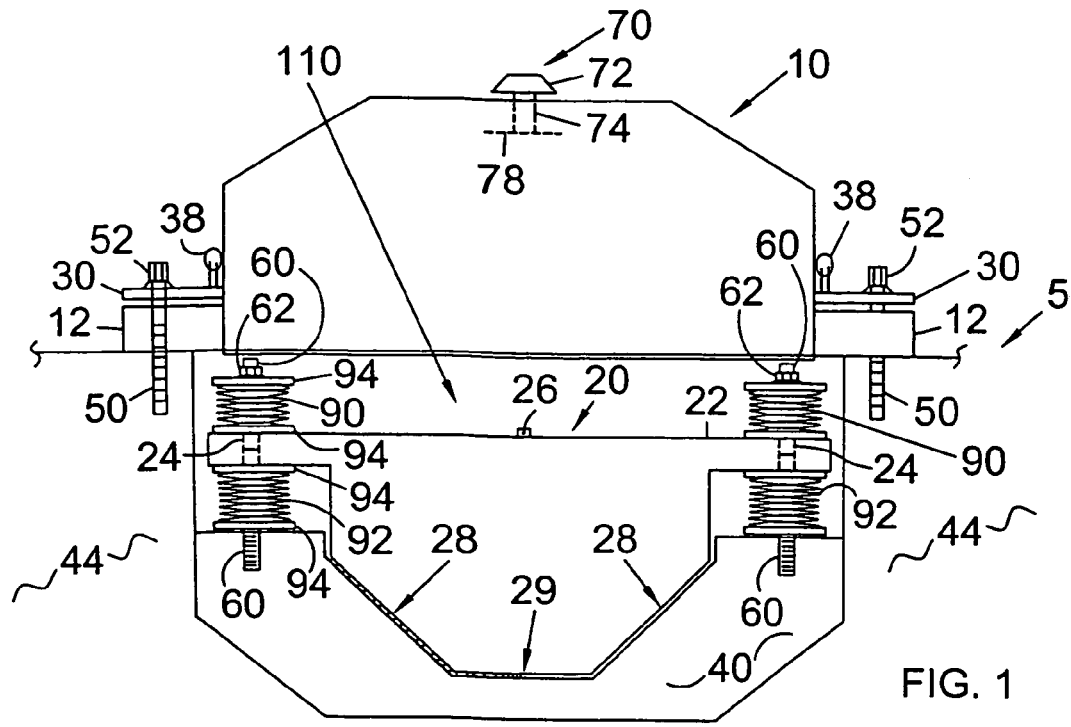
FIG. 1 is an end view of an embodiment of the invention.

FIG. 1 shows vessel 5 as an example of an embodiment of the invention. Vessel 5 includes vessel-top 10 and vessel-bottom 20. The vessel-top in this example is removable and can be lifted from the vessel-bottom with, for example, pneumatic or hydraulic cylinders or a hoist. Vessel-top 10 is shown in more detail in FIGS. 2 and 3. Vessel-top 10 includes vessel-top flanges 12 having top flange holes 14. In this example, each vessel-top flange 12 has six top flange holes 14 but can have more or fewer top flange holes 14 as needed. The number of top flange holes 14 required is determined based on the length of the top vessel 10, the forces acting on the top vessel 10 as a result of the explosive charge and the strength of top bolts 50 (described below).

Figure 4:
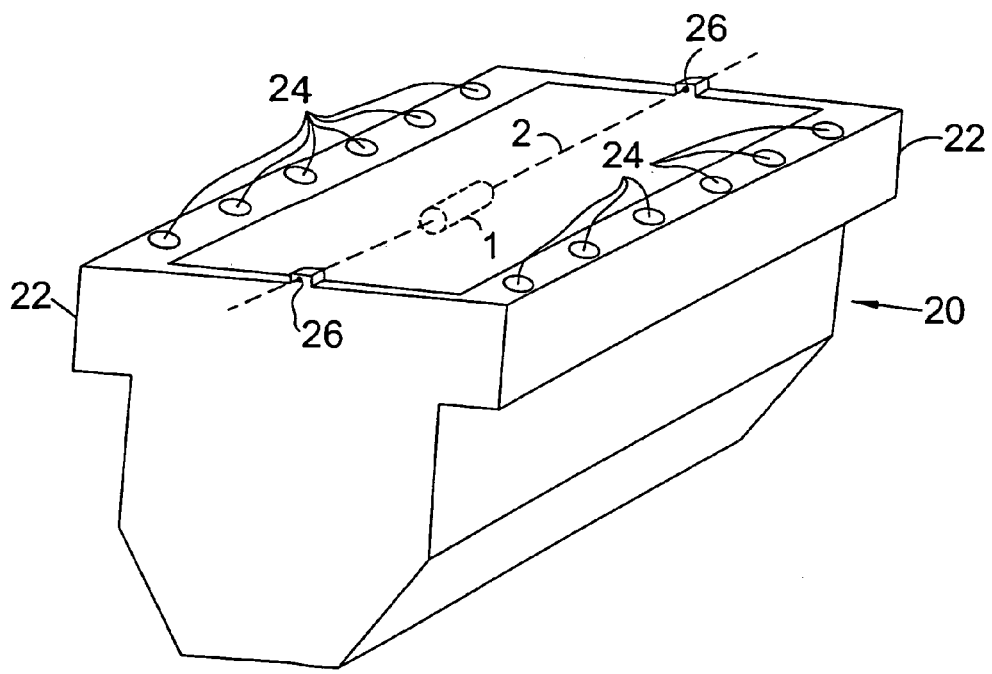
FIG. 4 is a perspective view of the vessel-bottom of an embodiment of the invention.
Figure 5:
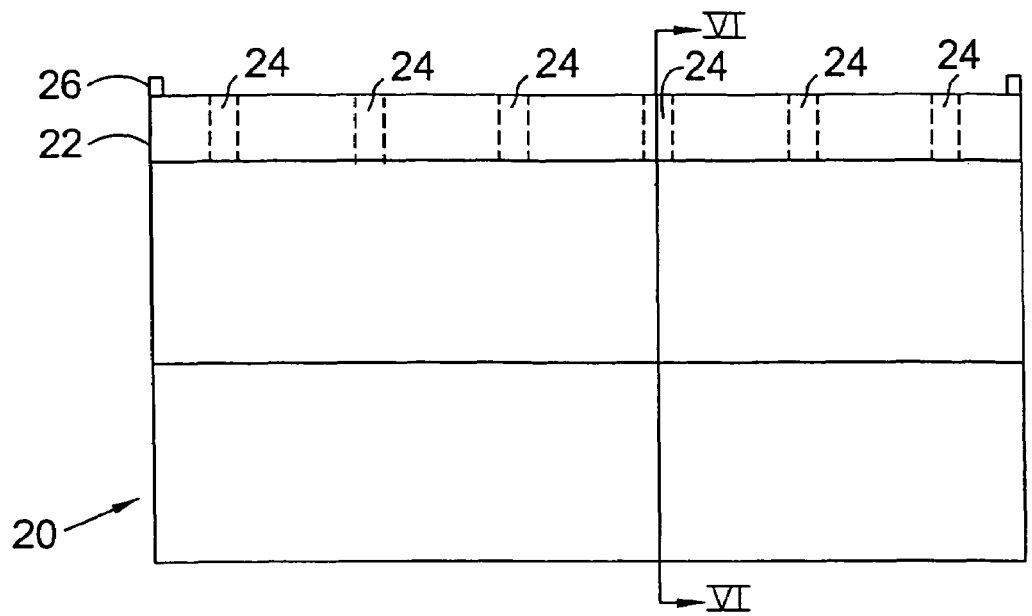
FIG. 5 is a side view of the vessel-bottom of FIG. 4.
Figure 6:
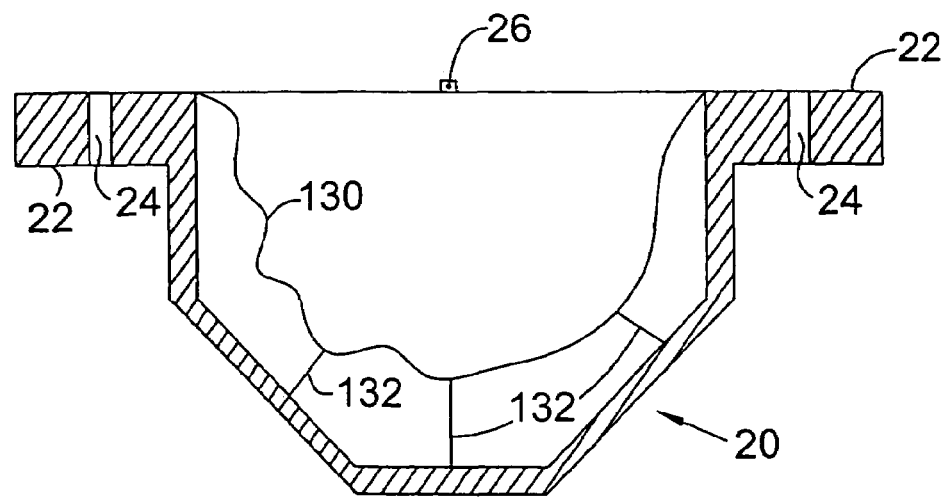
FIG. 6 is a sectional view of the vessel-bottom of FIGS. 4 and 5 along section line VI-VI of FIG. 5.

An example of the vessel-bottom 20 is shown in more detail in FIGS. 4-6. Vessel-bottom 20 includes vessel-bottom flanges 22 having bottom flange holes 24. In this example, each vessel-bottom flange 22 has six bottom flange holes 24. However, similarly to the vessel-top flanges 12, the vessel-bottom flanges 22 can have more or fewer bottom flange holes 24 depending on the length of bottom vessel 20, the forces resulting from the explosive charge and the strength of bottom bolts 60 (discussed below). Bottom vessel 20 includes, for example, eyeholes 26 for holding a hanging wire 2 on which the explosive charge 1 is held. Hooks or other holding members can be used for holding the explosive charge in position.

Figure 14:
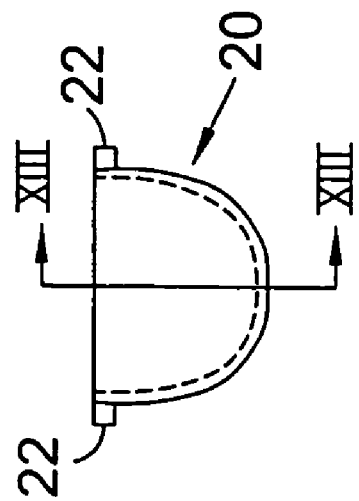
FIG. 14 is an end view of the embodiment shown in FIG. 13.
Figure 13:
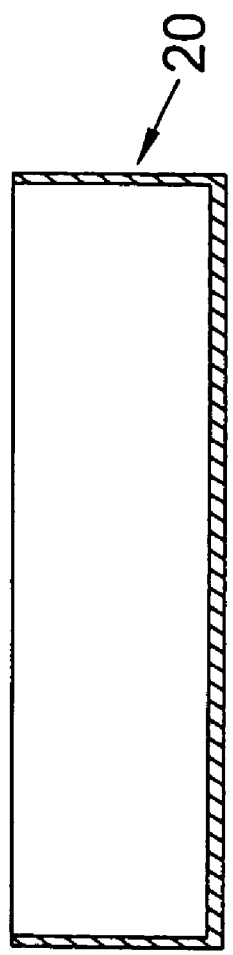
FIG. 13 is a cross-sectional view along section line XIII-XIII of the semi-cylindrical shaped vessel-bottom of FIG. 14.

An example of the material used for the vessel-top 10 and the vessel-bottom 20 is mild steel or stainless steel 2"-4" thick. The lower sides 28 of the vessel-bottom 20 are sloped with relation to the bottom 29 of the vessel-bottom 20. This shape has proven more effective than a hemispherical shape vessel-bottom. In addition, sloped lower sides 28 are preferred to a rectangular cross-section in order to reduce the stresses in the joints between the lower sides 28 and the bottom 29. While this shape is used as an example, the vessel-bottom could also be formed in a semi-cylindrical shape (as shown in FIGS. 13 and 14).

The sloped sides or semi-cylindrical shape reflects shock waves created by the explosive force toward the material that is being treated. The reflected shock waves can combine with other shock waves to result in additive compression waves or to create tensile stress by the sudden reduction in compression waves or by cavitation within the liquid. The succession of compressive and tensile forces works the material being treated. For example, a fibrous material can be defibrillated. In the case of a vessel having sloped sides, the optimum angle of the sloped sides can be determined for a particular application or material being treated.

In the embodiment shown in FIG. 1, the vessel-bottom 20 is held in position by bottom bolts 60 which are embedded into and held in position by foundation liner 40. The foundation liner should be made from a strong material such as, for example, steel in order to securely hold bottom bolts 60 in place. Vessel-bottom flanges 22 are positioned between top springs 90 and bottom springs 92. Top springs 90 and bottom springs 92 are, for example between 8" and 12" in diameter, preferably 10" in diameter, and have spring rates of between 10,000 lbs/in and 50,000 lbs/in, preferably 20,000 lbs/in. Washers 94 are located at each end of each top spring 90 and each bottom spring 92. A nut 62 is used to hold each assembly of washers 94, top spring 90, vessel-bottom flange 22 and bottom spring 92 in position on each bottom bolt 60. The example of vessel-bottom 20 shown in FIGS. 4-6 would have 12 such assemblies. In this embodiment, the vessel-bottom 20 is held in position such that it does not contact foundation liner 40 at any time before, during or after detonation of the explosive charge. Foundation liner 40 can be positioned in the bottom of a trench 110 formed in a foundation 44.

One example of a process of the invention is to fill vessel-bottom 20 to a desired level with a liquid, such as, for example, water, place the hanging wire 2 in place using the eyeholes 26, then submerge the wood chips into the liquid. In this example, the material (wood chips) is a material that comprises a plurality of pieces that can move independently with respect to one another and are subjected to a substantially uniform pressure on all surfaces immediately prior to being subjected to the explosive forces. Although eyeholes 26 are used in this example, it is noted that any appropriate holding device, such as, for example, hooks, can also be used. An explosive charge 1 is then run along the hanging wire 2 and is connected to an initiation device (not shown) such as, for example, a blasting cap, or capable of being detonated by non-physical contact methods such as, for example, radio or ultrasonic signals. The vessel-top 10 is then placed and secured on the foundation 44. The explosive charge is preferably below the surface of the liquid when detonated. An example of the explosive charge is 0.25-5 lbs. of PETN detonated by a blasting cap of #8 strength or higher.

Figure 2:
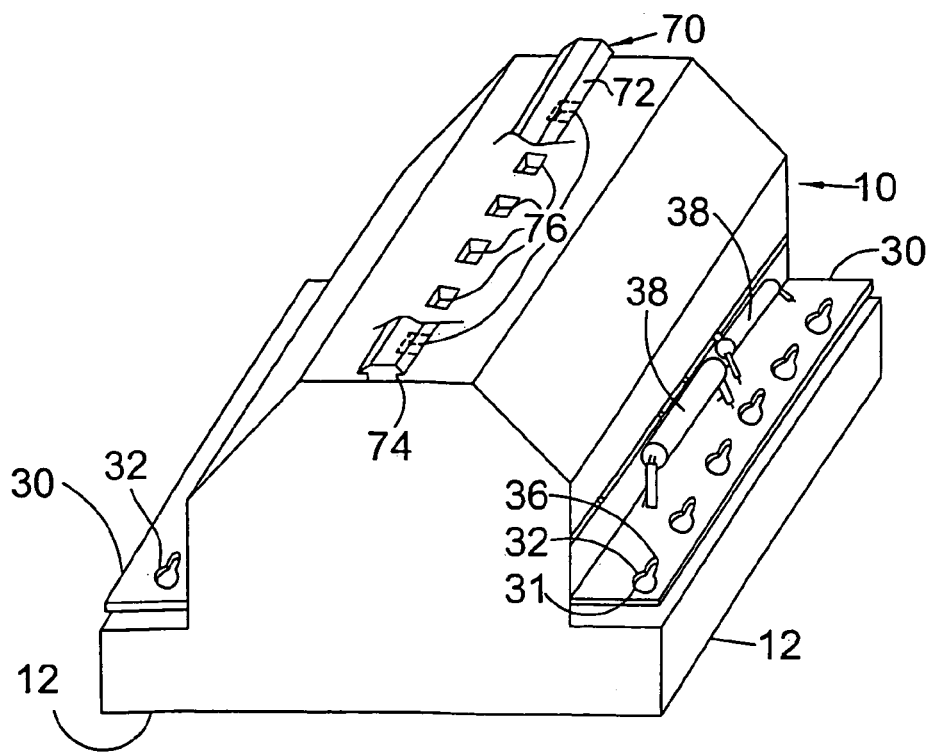
FIG. 2 is a perspective view of the vessel-top of an embodiment of the invention.
Figure 3:
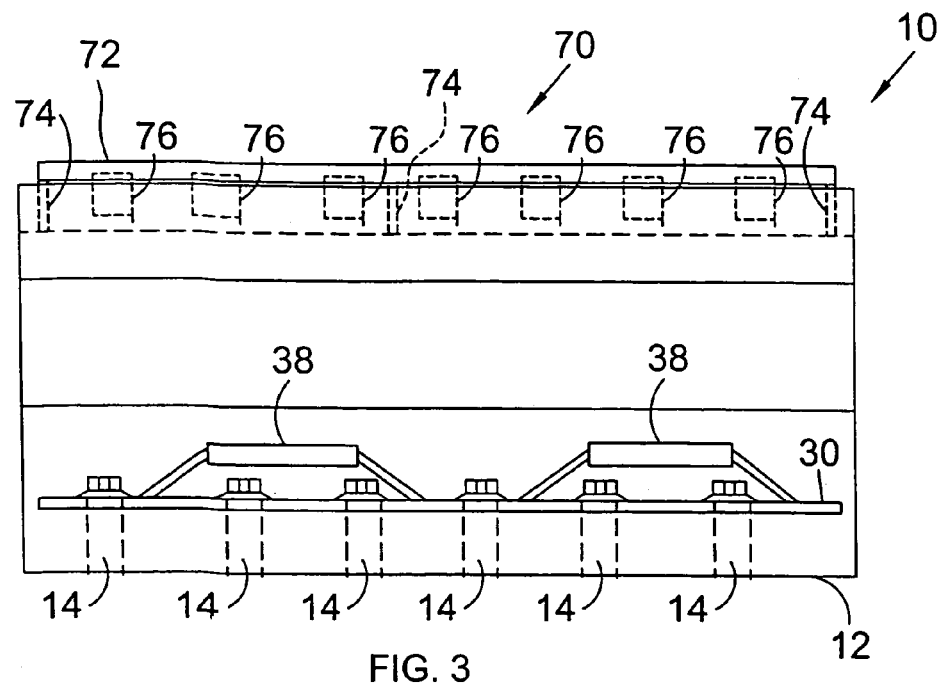
FIG. 3 is a side view of the vessel-top of FIG. 2.

Top bolts 50, each having a bolt head 52, are embedded in and held by foundation 44. The vessel-top 10 is lowered into position such that each bolt head 52 passes through a top flange hole 40 and a round portion 34 of a locking plate hole 32 in a locking plate 30. A locking plate 30 is attached to the vessel-top 10 and located above each vessel-top flange 12. Locking plate holes 32 are located in locking plates 30 and, in this example, each have a round portion 34 and a slot 36 as shown in FIG. 2. The locking plates 30 are attached to the vessel-top 10 by locking plate positioners 38. The locking plates 30 are initially positioned such that the round portions 34 of the locking plate holes 32 are lined up with the top flange holes 14. Round portion 34 of each locking plate hole 32 is large enough to allow bolt head 52 to pass therethrough. After the vessel-top 10 is lowered into position over top bolts 50 so that bolt heads 52 extend above locking plates 30 (as shown in FIG. 3), locking plates 30 are moved by locking plate positioners so that slots 36 of locking plate holes 32 are positioned around top bolts 50 and immediately below bolt heads 52. Because the bolt heads 52 are too large to pass through the slots 36, the vessel-top 10 cannot be lifted off of the top bolts 50 when the locking plates 30 are in this position.

The above-described locking mechanism is made strong enough to keep the vessel-top 10 from moving when subjected to the forces resulting from the explosive charge. This locking mechanism is one example of a structure that provides sufficient locking of the vessel-top 10 and also allows quick unlocking and removal of the vessel-top 10.

A ridge vent 70 is provided as a part of the vessel-top 10 in order to allow explosive gases to escape from the vessel 5. FIG. 2 shows an example of ridge vent 70 having a ridge vent roof 72 attached to the vessel-top 10 by ridge vent roof supports 74. The ridge vent roof 72 is located above vent holes 76 in, in this example, a top portion of the vessel-top 10. FIGS. 1 and 3 show a deflector 78 positioned below vent holes 76. Deflector 78 prevents liquid forced upward by the explosion from shooting directly, through vent holes 76. Ridge vent roof 72 deflects downward any liquid or other matter passing through vent holes 76. The vent 70 allows the pressure inside the vessel to be the same as the pressure outside the vessel.

Upon initiation of the explosive charge, the material, in this example, wood chips is exposed to extremely high pressures created by the designed vessel boundaries as well as the liquid. Currently, the pressures range from 5,000 psi to near 100,000 psi at the explosive interface. However, it is conceivable that higher pressures will be available with future explosives. The pressure is great enough to penetrate wood chip cell walls and extract the undesired lignin component. Also the high pressure should create some positive defibrillation results on the cellulose fibers.

By introducing the vessel 5 before or after the digester, the required amount of the products mentioned above should be greatly reduced. For instance, the amount of raw material $Na_2S$ and NaOH should be reduced for kraft pulping and the amount of sulfurous acid and bisulfate compound should be reduced for sulfite pulps. Also the amount of sulfide compound by-products should be reduced, the amount of time the digester is held at high temperatures should be reduced, the workload on the chemical recovery systems should be lessened, and the workload on the digesters themselves should be reduced.

Wood chips possess entrained air, which retards the removal of lignin in the cooking process. Pulping mills presteam the chips before they are introduced to the digester to remove the undesired air. The vessel 5 can reduce or eliminate steam usage by exposing the chips to extremely high pressures to force out entrained air.

Defibrillating the cellulose fibers will be beneficial. The high pressures create some positive defibrillation on the cellulose fibers. Therefore, the mill can experience reductions in time and money associated with the beaters and refiners, as well.

There are variables used to define the desired size of charge to achieve optimal lignin removal and cellulose defibrillation. The liquid temperature in the vessel is limited only by its boiling point. When water is used as the liquid, the liquid temperature range is preferably between 32° F. and 212° F., and more preferably between 70° F. and 190° F. In addition, the distance between the explosive charge and the wood chips can be varied to achieve anywhere from 5,000 psi to near 100,000 psi at the explosive interface, preferably between 5,000 psi and 50,000 psi. If the explosive charge is detonated above the surface of the liquid, the pressures can be reduced by increasing the distance above the surface of the liquid at which the explosive charge is detonated. If the explosive charge is detonated below the surface of the liquid, or if capacitor discharge is used, the material, for example wood chips, can be separated and held away from the explosive interface by a mesh or other retaining structure. An example of the retaining structure is retaining mesh 130 shown in FIG. 6. In this example, retaining mesh 130 is held in place by retaining mesh restraints 132. By using a retaining structure to control the distance between the explosive charge and the material, the pressure to which the material is subjected can be controlled. When water is used as the liquid, the addition of small quantities of $Na_2S$, for example a sufficient quantity to produce 0-25% sulfidity, to the water can prove very beneficial to the lignin removal.

If the vessel is used to process the material after the material exits the digester, chemicals present in the material can be used advantageously when the material is subjected to the high pressures in the vessel. Similarly, the material can be subjected to the high pressures in the vessel at any stage of processing. Due to the existence of particular chemicals in the material at certain stages of processing, it may be determined that subjecting the material to the high pressures in the vessel at a particular stage is advantageous. For example, it may be advantageous to subject the material to the high pressures in the vessel before the brown stock washers.

The length of the vessel may be varied to achieve maximum wood chip poundage per explosive discharge, hence governing the hourly output.

Figure 11:
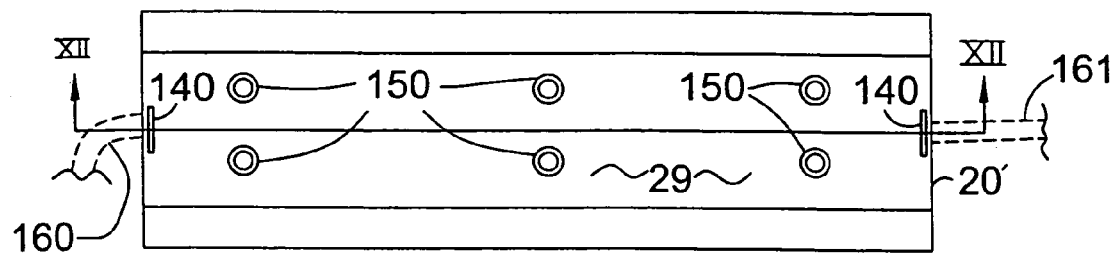
FIG. 11 is a top view of the vessel-bottom of an embodiment of the invention using capacitor discharge.
Figure 12:
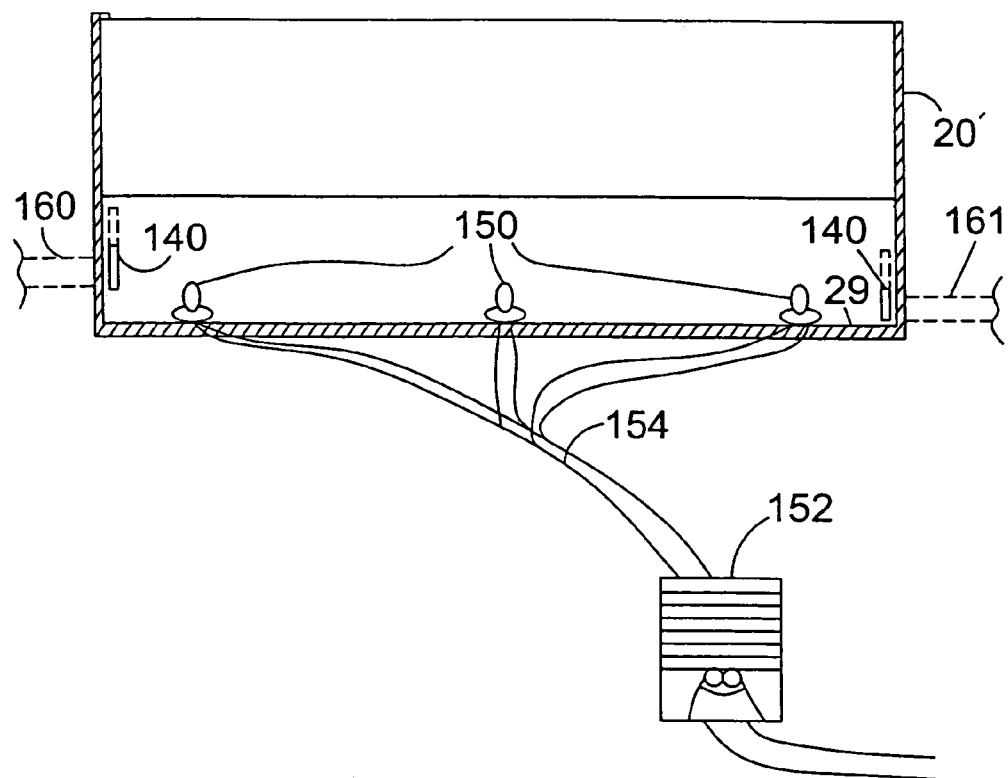
FIG. 12 is a sectional side view of the vessel-bottom of the embodiment shown in FIG. 11 taken along section line XII-XII.

An example of using capacitor discharge as the source of the explosive forces is shown in FIGS. 11 and 12. In this example, vessel-bottom 20' has electrodes 150 positioned in its bottom 29. A capacitor discharge machine 152 is connected to the electrodes 150 by wires 154 and a power source (not shown). The electrodes 150 can be furnished in any appropriate number and can also be positioned on portions of the vessel-bottom 20' other than the bottom 29. As water and wood chips, for example, pass by the electrodes 150, the electrodes 150 can be fired as quickly as 3 times per second. By using capacitor discharge, there is no need to open the vessel to replace the explosive charge.

A particularly useful application using capacitor discharge is the purification of water. The explosive forces, for example through the compression waves, can kill bacteria and other harmful impurities in the water or other liquid.

The example shown in FIGS. 11 and 12 is a vessel without an inlet or outlet. However, the capacitor discharge process can be applied to a vessel having an inlet 160 and an outlet 161 as shown, for example, in dotted lines in FIGS. 11 and 12. In a vessel having an inlet 160 and an outlet 161 as shown in FIGS. 11 and 12, the liquid containing the material to be subjected to the explosive forces continuously flows into the vessel through inlet 160 and out of the vessel through outlet 161. The electrodes are repeatedly fired at a rate that subjects the material to the required forces as the material flows by the electrodes. A vessel according to this example allows a continuous flow of treated material without removal of the vessel-top. An embodiment of such a vessel has protective members 140 that cover the inlet 160 and outlet 161 at the moment in time when the electrodes are fired. Such protective members can be, for example, reciprocating sliding plates that are synchronized with the electrodes or rotating circular plates having alternating solid and open segments such that a solid segment covers the inlet/outlet when the electrodes are fired.

The continuous treatment of material described above can also be achieved by placing capacitor discharge electrodes at various positions within the wall of a pipe (instead of the vessel described above) and passing the material laden liquid through the pipe and past the electrodes. The capacitor electrode size, shape, and placement and the pipe size can be changed to accommodate many different strengths of explosions in the vessel. For example, the use of toroidal capacitor electrodes may be beneficial. The capacitor electrodes and their associated capacitor discharge machines can be different sizes and set up at different locations along a continuous feed of pipe to allow for more and varied treatments.

In the case of the vessel being a pipe, the pressure inside the pipe immediately before the introduction of the explosive forces may be greater than, equal to, or less than the pressure outside the pipe.

Figure 7:
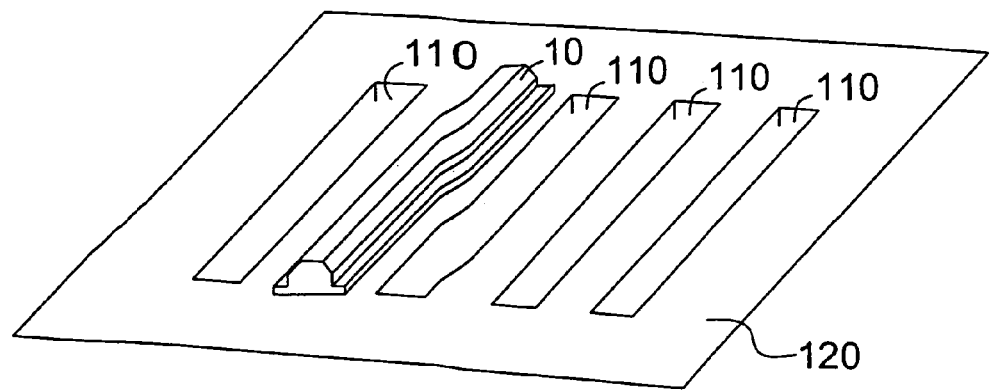
FIG. 7 is a simplified perspective view of a mass production facility incorporating the invention.

FIG. 7 shows an application of the invention directed to a high level of output in a commercial processing plant. In this example, multiple (5) trenches 110 are provided in a plant floor 120. Each trench 110 contains a vessel-bottom 20 and mounting structure as, for example, shown in FIG. 1. One vessel-top 10 is provided. In this example, a first trench 110 is prepared with liquid, material to be processed (for example, wood chips) and an explosive charge. The vessel-top 10 is then positioned and locked in place and the explosive charge is detonated. The vessel-top 10 is then unlocked, removed from the first trench 110, positioned on a second trench 110 (previously prepared) and locked in place. The explosive charge is then detonated in the second trench 110. While the explosive charge is being detonated in any particular trench 110, the other trenches 110 can be emptied and prepared for another detonation. This type of system is beneficial because it requires only one vessel-top 10 for a plurality of trenches 110. As the vessel-top 10 is made from steel or other high strength material, and is repeatedly subjected to explosive forces, it is an expensive part of the vessel 5. As a result, a system, such as this one, that permits an increased number of detonations per vessel-top 10 is more cost effective. Although this example uses five trenches 110 arranged in parallel to each other and one vessel-top 10, it is noted that the number and position of trenches 110 and the number of vessel-tops 10 used would be optimized by taking into consideration the amount of time needed to empty and prepare a trench 110 and the amount of time required to unlock, remove, relocate and lock a vessel-top 10 in position. It is anticipated that the optimum combination of these factors would result in the vessel-top 10 being continually moved from trench to trench, being in position above any particular trench only as long as required to safely detonate the explosive charge.

Figure 8:
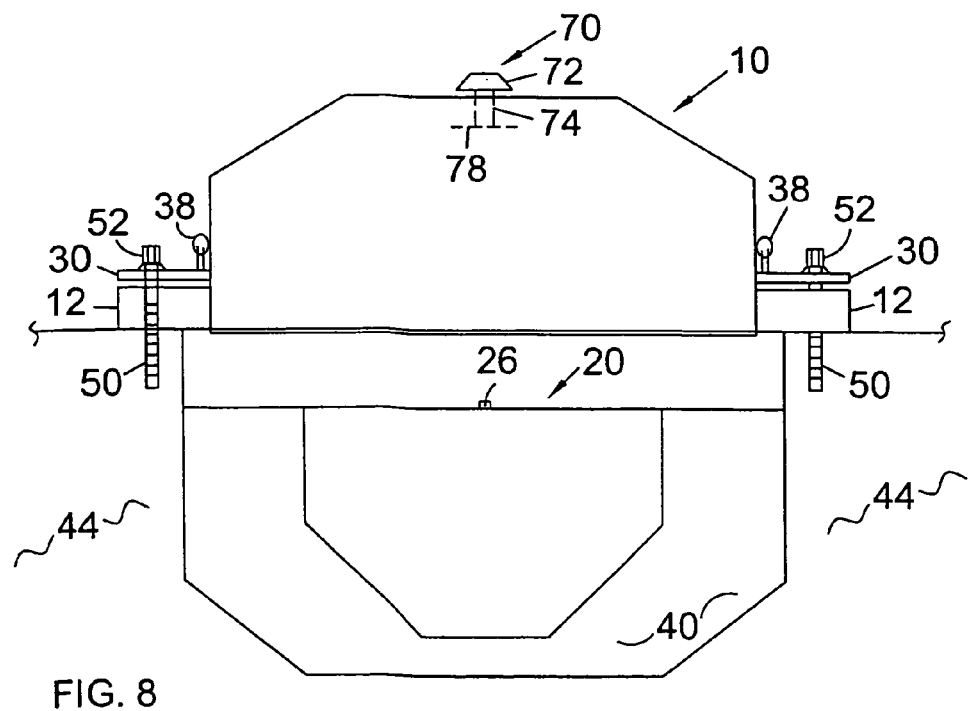
FIG. 8 is an end view of an embodiment of the invention in which the vessel-bottom is rigidly held in position.

While the example of the vessel-bottom 20 shown in FIG. 1 is resiliently held in position by top springs 90 and bottom springs 92, it is also possible to rigidly hold vessel-bottom 20 in position so that it does not move relative to foundation liner 40 when subjected to the detonation of the explosive charge (as shown in FIG. 8). In this embodiment, the foundation liner 40 can be made from a material such as concrete or sand.

Figure 9:
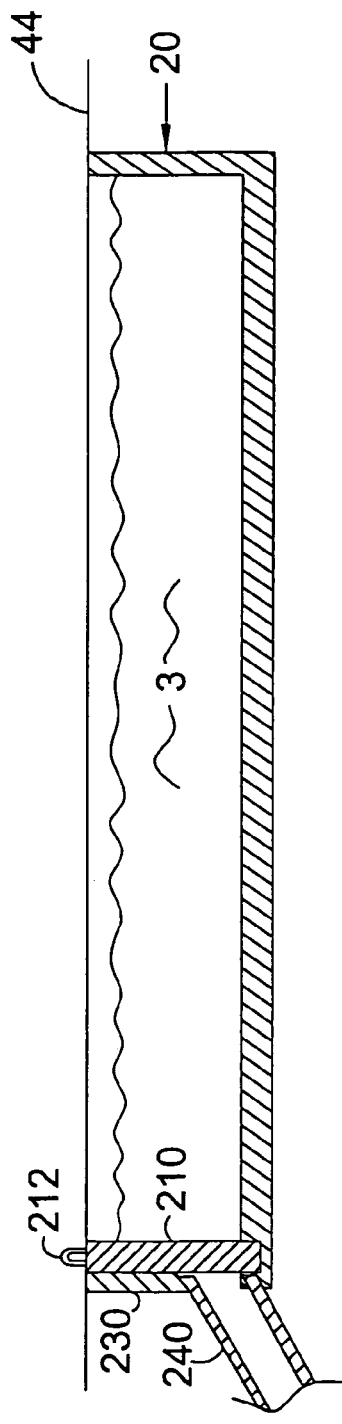
FIG. 9 is a sectional side view of an embodiment of the vessel-bottom of the invention shown in the closed position.
Figure 10:
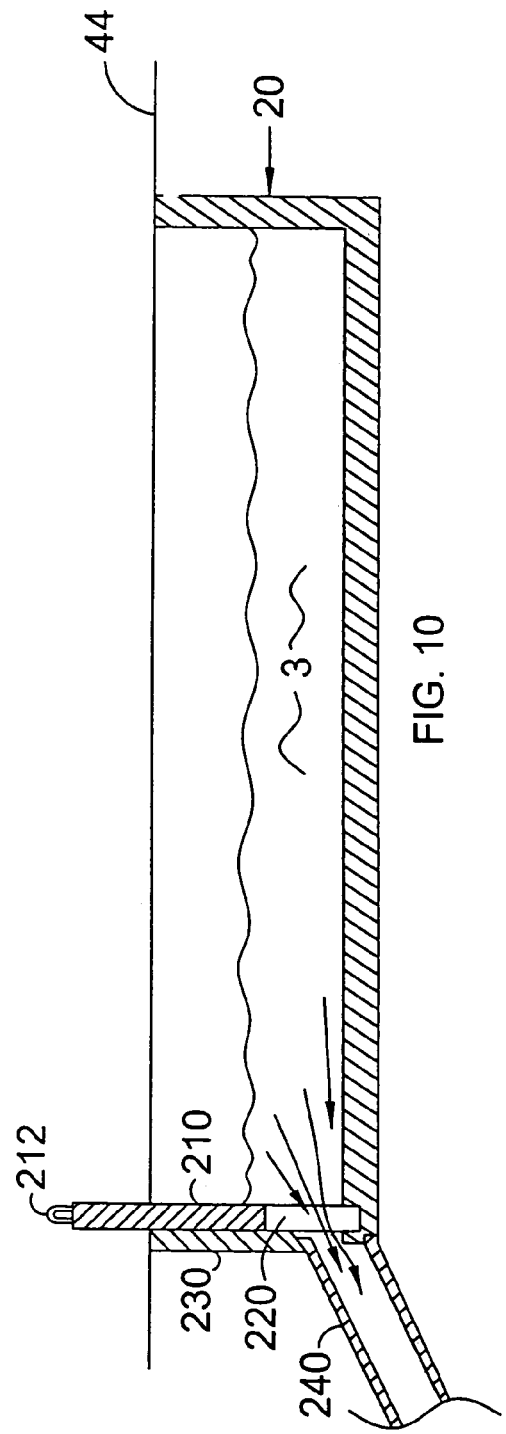
FIG. 10 is a sectional side view of the embodiment shown in FIG. 9 shown in an open position.

In the previous examples, the material within the vessel-bottom 20 after detonation can be removed by, for example, either scooping or pumping. FIGS. 9 and 10 show an embodiment of the invention in which one end of the vessel-bottom 20 is a sliding panel 210 having a lifting hook 212. The sliding panel 210 slides vertically within a slot 220 formed in the vessel-bottom 220. The sliding panel 210 and slot 220 abut end wall 230 of the vessel-bottom 20 in order to eliminate or minimize the forces to which slot 220 is subjected during detonation. A pipe 240 is attached to end wall 230 so that when, after detonation, sliding panel 210 is lifted upward, the liquid 3 containing the processed material flows out of the vessel-bottom 20 under the force of gravity.

The invention should greatly reduce the time, energy, raw chemical usage and emissions presently required and produced by the wood pulp processing industry.

Another application of the invention involves the hardening of metals for use in, for example, golf club heads. The process is preferably performed before the club head is attached to the hozzle and shaft. The club head is placed into the vessel and, through explosives or a process such as capacitor-discharge, is subjected to great pressure. The pressure greatly hardens only the outer layer of the club head due to the reflective pressure wave bouncing off of it. The increased hardness can increase the distance that a golf ball travels when hit by the club. The process can be done for numerous club heads at one time to reduce the unit cost of the process.

The hardening process can also be applied to other metal objects in which hardness is a desired characteristic. Such other objects may include, for example, cutting tools such as drill bits and saw blades and weapon components such as gun barrels, firing, pins, trigger components and mounting bases.

Other processes can be achieved by the invention such as adding flame retardant materials to wood, other pressure treatments of wood, or other processes in which one material (usually a fluid or suspended in a fluid) is forced into or through another material (usually a solid). For example, fabric or clothing can be softened or dye or other chemicals can be forced into fabric by the process. In these processes, the explosive charge is used as the source of pressure to force the one material into or through the other material. Other examples of the many possible uses of the invention include explosive art work, adding imprints to steel, killing microbes, pathogens and bacteria, and breaking down waste materials quickly for, for example, recycling. In these examples, the material is subjected to the explosive forces (either in liquid or in a gas, such as, for example, air) inside the vessel.

The invention is also applicable to treating a material that is partially in a liquid state and partially in a solid state such as, for example, a polymer or a polyol.

The invention is also applicable to maintaining pipes and other structures by keeping build-up from forming on, and/or removing build-up from, the inside of the pipes/structures. By mounting electrodes to the pipes/structures, and causing the explosive forces in the pipes/structures, material build-up can be prevented and/or removed. One application of this embodiment of the invention is pipes and other structures that carry polymers in a liquid state. Such pipes/structures are subject to build up of the polymers (in a solid state) on their interior walls. This build-up can be costly and time consuming to remove.

While the invention has been described in conjunction with the specific embodiments described above, it is evident that many alternatives, modifications and variations will be apparent to those skilled in the art. Accordingly, the embodiments of the invention as set forth above are intended to be illustrative and not limiting. Various changes may be made without departing from the spirit and scope of the invention as defined herein. For example, other materials, such as food, leather, denim jeans and other fibers, can be subjected to the explosive forces in the vessel to cause softening of the materials.

We claim:

1. A method of subjecting a solid liquid mixture to explosive forces, the method comprising:
    containing the solid liquid mixture in a vessel having a length in a first direction and a width in a second direction perpendicular to the first direction, the length being greater than the width;
    wherein the solid liquid mixture flows through the vessel along the first direction;
    subjecting the solid liquid mixture to the explosive forces in the vessel, the explosive forces being caused by introducing energy to the solid liquid mixture by discharging a capacitor through a capacitor discharge electrode located within the solid liquid mixture; and
    removing the material from the vessel after being subjected to the explosive forces.

2. The method of claim 1, wherein the vessel is a pipe.

3. The method of claim 1, wherein the explosive forces break pieces of the solid liquid mixture that are in a solid state into smaller pieces.

4. The method of claim 1, wherein the energy is supplied to the capacitor discharge electrode by a capacitor discharge machine attached to the capacitor discharge electrode.

5. The method of claim 1, wherein the solid liquid mixture includes a polymer.

6. The method of claim 1, wherein the solid liquid mixture includes a polyol.

7. The method of claim 2, wherein the electrodes are mounted in a section of the pipe that has a larger diameter than other sections of the pipe.

8. The method of claim 1, wherein the explosive forces prevent the build up of material on the vessel walls.

9. A device for subjecting a solid liquid mixture to explosive forces, the device comprising:
    a vessel having a length in a first direction and a width in a second direction perpendicular to the first direction, the length being greater than the width;
    wherein the solid liquid mixture flows through the vessel along the first direction; and
    a plurality of capacitor discharge electrodes attached to the vessel for subjecting the solid liquid mixture to the explosive forces in the vessel, the explosive forces being caused by introducing energy to the solid liquid mixture material by discharging a capacitor through the capacitor discharge electrodes when the electrodes are located within the solid liquid mixture.

10. The device of claim 9, wherein the vessel is a pipe.

11. The device of claim 9, further comprising a capacitor discharge machine that supplies the energy to the capacitor discharge electrodes.

12. The device of claim 10, wherein the electrodes are mounted in a section of the pipe that has a larger diameter than other sections of the pipe.

13. The device of claim 9, wherein the explosive forces prevent the build up of material on the vessel walls.

14. A method of subjecting a solid liquid mixture to explosive forces, the method comprising:
    containing the slurry in a pipe having a length in a first direction and a width in a second direction perpendicular to the first direction, the length being greater than the width;
    wherein the solid liquid mixture flows through the pipe in the first direction;
    subjecting the solid liquid mixture to the explosive forces in the pipe, the explosive forces being caused by introducing energy to the solid liquid mixture by discharging a capacitor through a capacitor discharge electrode located within the solid liquid mixture; and
    removing the solid liquid mixture from the pipe after being subjected to the explosive forces.

15. The method of claim 14, wherein the explosive forces prevent the build up of material on the pipe walls.

* * * * *